United States Patent
Chow

(10) Patent No.: US 6,249,543 B1
(45) Date of Patent: Jun. 19, 2001

(54) PROTOCOL FOR TRANSCEIVER INITIALIZATION

(75) Inventor: Jacky S. Chow, Gilroy, CA (US)

(73) Assignee: Amati Communications Corporation, San Jose, CA (US)

(*) Notice: Subject to any disclaimer, the term of this patent is extended or adjusted under 35 U.S.C. 154(b) by 0 days.

(21) Appl. No.: 09/448,565

(22) Filed: Nov. 23, 1999

Related U.S. Application Data

(62) Division of application No. 08/879,390, filed on Jun. 20, 1997, now Pat. No. 6,064,692.

(51) Int. Cl.[7] ................................................ H04B 1/38
(52) U.S. Cl. .................. 375/219; 375/222; 375/225; 370/468
(58) Field of Search ........................... 375/219, 222, 375/225, 260, 240; 370/468, 235, 236; 455/516; 379/93.08

(56) References Cited

U.S. PATENT DOCUMENTS

| | | | |
|---|---|---|---|
| 4,450,558 | 5/1984 | Hampton et al. | 370/106 |
| 4,644,523 | 2/1987 | Horwitz | 370/18 |
| 4,958,342 | 9/1990 | Williams et al. | 370/79 |
| 5,023,869 | 6/1991 | Grover et al. | 370/84 |
| 5,170,413 | 12/1992 | Hess et al. | 375/38 |
| 5,285,474 | 2/1994 | Chow et al. | 375/13 |
| 5,293,401 | 3/1994 | Serfaty | 375/13 |
| 5,305,349 | 4/1994 | Dent | 375/1 |
| 5,345,440 | 9/1994 | Gledhill et al. | 370/19 |
| 5,347,547 | 9/1994 | Gleichert et al. | 375/114 |
| 5,355,374 | 10/1994 | Hester et al. | 370/84 |
| 5,396,494 | 3/1995 | Roposh | 370/85.2 |
| 5,400,322 | 3/1995 | Hunt et al. | 370/19 |
| 5,404,355 | 4/1995 | Raith | 370/95.1 |

(List continued on next page.)

FOREIGN PATENT DOCUMENTS

| | | |
|---|---|---|
| 0 529 421 A2 | 3/1993 | (EP) . |
| 0 653 859 A1 | 5/1995 | (EP) . |
| 2 300 546 | 11/1996 | (GB) . |
| 2 303 032 | 2/1997 | (GB) . |
| 93/09617 | 5/1993 | (WO) . |
| 94/21061 | 9/1994 | (WO) . |
| 95/036356 A1 | 2/1995 | (WO) . |
| 95/05042 | 2/1995 | (WO) . |
| 97 03506 | 1/1997 | (WO) . |

OTHER PUBLICATIONS

American National Standard Institute (ANSI) for Telecommunications—Network and Customer Installation Interfaces—Asymmetric Digital Subscriber Line (ADSL) Metallic Interface, ANSI T1.413–1995, New York, New York.

Bingham, J., "Multicarrier Modulation for Data Transmission: An Idea Whose Time Has Come," IEEE Communications Magazine, vol. 28, No. 5, pp. 5–14, May 1990.

(List continued on next page.)

*Primary Examiner*—Stephen Chin
*Assistant Examiner*—Mohammed Ghayour
(74) *Attorney, Agent, or Firm*—J. Dennis Moore; W. James Brady, III; Frederick J. Telecky, Jr.

(57) ABSTRACT

Improved initialization techniques for initializing data transfer between a pair of transceivers in a multicarrier modulation transmission system are disclosed. The multicarrier modulation transmission system normally includes a central office and a remote unit, with the central office having at least one transceiver and the remote unit having a transceiver. For each pair of transceivers, the transceiver at either the central office or the remote unit controls the determining of bit allocations for both upstream and downstream data transmissions without assistance from the other transceiver of the pair. The initialization processing for the pair of transceivers is thus performed efficiently and with better centralized control.

10 Claims, 9 Drawing Sheets

U.S. PATENT DOCUMENTS

| | | | |
|---|---|---|---|
| 5,440,561 | 8/1995 | Werronen | 370/105.1 |
| 5,444,697 | 8/1995 | Leung et al. | 370/19 |
| 5,479,447 | 12/1995 | Chow et al. | 375/260 |
| 5,495,483 | 2/1996 | Grube et al. | 370/95.1 |
| 5,590,160 | 12/1996 | Ostman | 375/367 |
| 5,596,604 | 1/1997 | Cioffi et al. | 345/260 |
| 5,603,081 | 2/1997 | Raith et al. | 455/33.1 |
| 5,606,577 | 2/1997 | Grube et al. | 375/295 |
| 5,666,378 | 9/1997 | Marchetto et al. | 375/222 |
| 5,673,290 | 9/1997 | Cioffi | 375/260 |
| 5,673,296 | 9/1997 | Ohgane | 375/368 |
| 5,680,394 | 10/1997 | Bingham et al. | 370/294 |
| 5,745,837 | 4/1998 | Fuhrmann | 455/5.1 |
| 5,812,599 * | 9/1998 | Van Kerckhove | 375/260 |
| 5,828,704 | 10/1998 | Kuramatsu | 375/316 |
| 5,838,667 | 11/1998 | Bingham et al. | 370/294 |
| 5,912,921 | 6/1999 | Warren et al. | 375/220 |
| 5,943,617 | 8/1999 | Nakamura | 455/423 |
| 6,055,268 * | 4/2000 | Timm et al. | 375/229 |
| 6,064,692 * | 5/2000 | Chow | 375/219 |
| 6,075,821 * | 6/2000 | Kao et al. | 375/260 |
| 6,128,348 * | 10/2000 | Kao et al. | 375/260 |
| 6,130,882 * | 10/2000 | Levin | 370/252 |

OTHER PUBLICATIONS

Chow et al. "Equalizer Training Algorithms for Multicarrier Modulation Systems", (1993), pp. 761–765.

Chow et al., "A Discrete Multitone Transceiver System for HDSL Applications", IEEE Journ. on Sel. areas in Comm., vol. 9, No. 6, Aug. 1991, pp. 895–908.

Fischer & Huber, "A New Loading Algorithm for Discrete Multitone Transmission," IEEE, 1996.

Fleming, S. et al., "ADSL: The On–Ramp to the Information Highway," Telephony, pp. 20–26, Jul. 12, 1993.

J. Cioffi et al., "An SDMT Line Code Proposal with Rationale for Support," Standards Project T1E1.4: VDSL, T1E1.4/96–088, Apr. 22, 1996.

J. Cioffi, "Add/Delete SDMT Solution for Unsynchronized VDSL Lines (96–247)," Standards Project T1E1.4:VDSL, T1E1.4/96–247, Sep. 4, 1966.

J. Cioffi, "SDMT Crosstalk Canceler (96–246)," Standards Project T1E1.4: VDSL, T1E1.4/96–246, Sep. 4, 1996.

J.S. Chow et al., "DMT Initialization: Parameters Needed for Specification in a Standard," Standards Project T1E1.4 ADSL, T1E1.4/93–022, Mar. 8, 1993.

J.S. Chow et al., "Mixing Asymmetric with Symmetric Services in SDMT Systems," Standards Project T1E1.4:VDSL, T1E1.4/96–269, Sep. 4, 1966.

J.S. Chow, "Asymmetric Option for SDMT VDSL Systems," Standards Project T1E1.4:VDSL, T1E1.4/96–182, Jul. 22, 1996.

Kirkman et al., "Detection of Characteristic Phases Using FFT's", International Conference on Acoustics, Speech and Signal Processing IEEE, Mar. 1992.

Leonard J. Cimini, Jr., "Analysis and Simulation of a Digital Mobile Channel Using Orthogonal Frequency Division Multiplexing", Jul. 7, 1985, IEEE Transactions on Communications, vol. COM–33, No. 7.

P.S. Chow et al., "A Practical Discrete Multitone Transceiver Loading Algorithm for Data Transmission over Spectrally Shaped Channels," IEEE Transactions on Communications, vol. 43, Nos. 2/3/4, Feb., Mar., Apr. 1995.

* cited by examiner

PROTOCOL FOR TRANSCEIVER INITIALIZATION

CROSS-REFERENCE TO RELATED APPLICATION

This application is a divisional of U.S. patent application Ser. No.: 08/879,390, filed Jun. 20, 1997, which issued as U.S. Pat. No. 6,064,692, on May 16, 2000, and is incorporated herein by reference for all purposes. This application is related to U.S. application Ser. No. 08/855,881, filed May 12, 1997 which issued as U.S. Pat. No. 6,009,122, on Dec. 28, 1999, is entitled METHOD AND APPARATUS FOR SUPERFRAME BIT ALLOCATION, and is incorporated herein by reference for all purposes.

BACKGROUND OF THE INVENTION

1. Field of the Invention

The present invention relates to data transmission systems and, more particularly, to transceiver initialization in data transmission systems.

2. Description of the Related Art

Data transmission systems which use multicarrier modulation have been receiving a lot of attention due to the high data transmission rates they offer. There are many different multicarrier modulation techniques that can be used in such systems. One popular multicarrier modulation technique is known as Discrete Multi Tone (DMT) modulation. Other multicarrier modulation techniques include Discrete Wavelet Multi Tone (DWMT) modulation and Orthogonal Frequency Division Multicarrier (OFDM) modulation.

One standard for high-speed data transmissions over twisted-pair phone lines that has developed is known as Asymmetric Digital Subscriber Lines (ADSL). The standard for ADSL is commonly known as T1E1 ADSL Standard of American National Standard Institute (ANSI). Another standard for high-speed data transmissions over twisted-pair phone lines that is presently proposed is known as Very High Speed Digital Subscriber Lines (VDSL). FIGS. 1A and 1B are basic exemplary diagrams of a transmitter and a receiver of a multicarrier modulation transmission system suitable for use with ADSL and VDSL.

FIG. 1A is a block diagram of a conventional transmitter 100 for a multicarrier modulation transmission system. The transmitter 100 receives data signals to be transmitted at a buffer 102. The data signals are then supplied from the buffer 102 to a forward error correction (FEC) unit 104. The FEC unit 104 compensates for errors that are due to crosstalk noise, impulse noise, channel distortion, etc. The signals output by the FEC unit 104 are supplied to a data symbol encoder 106. The data symbol encoder 106 operates to encode the signals for a plurality of frequency tones associated with the multicarrier modulation. In assigning the data, or bits of the data, to each of the frequency tones, the data symbol encoder 106 utilizes data stored in a transmit bit allocation table 108 and a transmit energy allocation table 110. The transmit bit allocation table 108 includes an integer value for each of the carriers (frequency tones) of the multicarrier modulation. The integer value indicates the number of bits of data that are to be allocated to the particular frequency tone. The value stored in the transmit energy allocation table 110 is used to effectively provide fractional number of bits of resolution via different allocation of energy levels to the frequency tones of the multicarrier modulation. In any case, after the data symbol encoder 106 has encoded the data onto each of the frequency tones, an Inverse Fast Fourier Transform (IFFT) unit 112 modulates the frequency domain data supplied by the data symbol encoder 106 and produces time domain signals to be transmitted. The time domain signals are then supplied to a digital-to-analog converter (DAC) 114 where the digital signals are converted to analog signals. Thereafter, the analog signals are transmitted over a channel to one or more remote receivers.

FIG. 1B is a block diagram of a remote receiver 150 for a conventional multicarrier modulation transmission system. The remote receiver 150 receives analog signals that have been transmitted over a channel by a transmitter. The received analog signals are supplied to an analog-to-digital converter (ADC) 152. The ADC 152 converts the received analog signals to digital signals. The digital signals are then supplied to a Fast Fourier Transform (FFT) unit 154 that demodulates the digital signals while converting the digital signals from a time domain to a frequency domain. The frequency domain digital signals are then supplied to a frequency domain equalizer (FEQ) unit 156. The FEQ unit 156 performs an equalization on the digital signals so the attenuation and phase are equalized over the various frequency tones. Then, a data symbol decoder 158 receives the equalized digital signals. The data symbol decoder 158 operates to decode the equalized digital signals to recover the data, orbits of data, transmitted on each of the carriers (frequency tones). In decoding the equalized digital signals, the data symbol decoder 158 needs access to the bit allocation information and the energy allocation information that were used to transmit the data. Hence, the data symbol decoder 158 is coupled to a received bit allocation table 162 and a received energy allocation table 160 which respectively store the bit allocation information and the energy allocation information that were used to transmit the data. The data obtained from each of the frequency tones is then forwarded to the forward error correction (FEC) unit 164. The FEC unit 164 performs error correction of the data to produce corrected data. The corrected data is then stored in a buffer 166. Thereafter, the data may be retrieved from the buffer 166 and further processed by the receiver 150. Alternatively, the received energy allocation table 160 could be supplied to and utilized by the FEQ unit 164. The received energy allocation table 160 could also be incorporated into the FEQ unit 164.

The bit allocation tables and the energy allocation tables utilized in the conventional transmitter 100 can be implemented as a single table or as individual tables. Likewise, the bit allocation tables and the energy allocation tables utilized in the remote receiver 150 can be implemented as a single table or as individual tables. Also, the transmitter 100 is normally controlled by a controller, and the remote receiver 150 is normally controlled by a controller. Typically, the controllers are programmable controllers.

The transmitter 100 and the remote receiver 150 illustrated in FIGS. 1A and 1B, respectively, optionally include other components. For example, the transmitter 100 could add a cyclic prefix to symbols after the IFFT unit 112, and the remote receiver 150 can then remove the cyclic prefix before the FFT unit 154. Also, the remote receiver 150 can provide a time domain equalizer (TEQ) unit between the ADC 152 and the FFT unit 154.

A data transmission system normally includes a central office and a plurality of remote units. Each remote unit communicates with the central office over a data link (i.e., channel) that is established between the central office and the particular remote unit. To establish such a data link, initialization processing is performed to initialize communications between the central office and each of the remote units. For purposes of the discussion to follow, a central office includes a central modem and a remote unit includes a remote modem. These modems are transceivers that facilitate data transmission between the central office and the remote unit. In general, the initialization processing for a multicarrier modulation transmission system includes the general operations of activation and acknowledgment of initialization requests, transceiver training at both the central office and the remote unit, exchange of rate requests between the central office and the remote unit, channel analysis, and exchange of transmitter settings (i.e., bit allocation tables) between the central office and the remote unit.

With respect to a multicarrier modulation transmission system in which a plurality of carriers (e.g., frequency tones) are used to transmit data between the central office and the remote unit, namely an ADSL system, the initialization processing conventionally carried out is known in the art. The T1E1 ADSL Standard describes an initialization process that transceivers must adhere to comply with this standard. The T1E1 ADSL Standard is hereby incorporated by reference.

FIGS. 1C and 1D are flow diagrams of conventional initialization processing 170. The initialization processing 170 is used to initialize communication links between a central office (CO) and a remote unit (RU). The initialization processing 170 is exemplary of the initialization processing described in the T1E1 ADSL Standard.

The conventional initialization processing 170 initially begins with activation and acknowledgment processing 172 at both the central office (CO) and the remote unit (RU). Next, transceiver training 174 is performed at both the central office (CO) and the remote unit (RU).

The central office (CO) then forwards 176 downstream rate requests and message information to the remote unit (RU). Next, the remote unit (RU) forwards 178 upstream rate requests and message information to the central office (CO). Often, the upstream rate requests are actually forwarded with the forwarding 176 of the downstream rate requests, and then mirrored back by the forwarding 178.

The rate requests are initially provided by a network, such as a telephone network, that typically couples to the central office (CO). The rate requests are usually provided before or just after the activation and acknowledgment processing 172. Also, the message information may, for example, identify features, options or limitations associated with the associated transceiver.

After exchanging the rate requests, the initialization processing 170 operates to determine 180 channel and noise characteristics at both the central office (CO) and the remote unit (RU). The channel and noise characteristics can be determined by transmitting a predetermined sequence (in both directions) over a link between the central office (CO) and the remote unit (RU). Then, signal-to-noise ratio (SNR) is determined tone by tone based on the channel and noise characteristics. Thereafter, upstream bit and energy allocation can be determined 182 at the central office (CO), and downstream bit and energy allocation can be determined 184 at the remote unit (RU). The bit and energy allocation operates to assign a number of bits to each of the carriers (e.g., frequency tones) of the multicarrier modulation transmission system. Likewise, the energy allocations assign energy levels to each of the carriers of the multicarrier modulation transmission system. In obtaining these allocations, the central office (CO) chooses an upstream rate which is often one of the available requested upstream rates it is able to satisfy, and the remote unit (RU) chooses a downstream rate which is often one of the available requested downstream rates it is able to satisfy.

Next, the remote unit (RU) forwards 186 the chosen downstream rate, a downstream performance margin for the chosen downstream rate, and message information all to the central office (CO). The message information may, for example, include estimated loop attenuation or total bits per symbol supported. A decision block 188 then determines whether the chosen downstream rate is less than all of the downstream requested rates. If the chosen downstream rate is less than all of the requested downstream rates, the data link between the transceivers is unable to support the requested level of service, and thus, the initialization processing 170 must be restarted.

On the other hand, if the chosen downstream rate is not less than all of the requested downstream rates, then the initialization processing 100 continues. In particular, the central office (CO) renders 190 a final decision on the downstream rate. In many cases, the central office (CO) follows the downstream rate chosen by the remote unit (RU). After making the final decision on the downstream rate at the central office (CO), the central office (CO) forwards 192 upstream performance margin, selected rate for the upstream and downstream transmissions, and message information to the remote unit (RU). The message information may, for example, include estimated loop attenuation or total bits per symbol supported. Next, a decision block 194 determines whether the selected upstream rate is less than all of the requested upstream rates. If the selected upstream rate is determined to be less than all of the requested upstream rates, the initialization processing 170 must be restarted.

On the other hand, when the selected upstream rate is not less than all of the requested upstream rates, the initialization processing 170 continues. Specifically, the central office (CO) sends 196 an upstream bit and energy table to the remote unit (RU). In addition, the remote unit (RU) sends 198 a downstream bit and energy table to the central office (CO). In the case where the central office (CO) overruled the initially chosen downstream rate with the final downstream rate, the remote unit (RU) must re-determine the downstream bit and energy allocations before sending the downstream bit and energy table to the central office (CO). Following block 128, the initialization processing 170 is complete and ends.

There are several drawbacks to the conventional initialization processing. One drawback is that at two different points in the initialization processing the central office and the remote unit are required to exchange data Each data exchange adds delay to obtaining initialization and thus the establishment of a data link over which data can be transmitted. Another drawback is that the central office only has partial information about the extent of data that downstream transmissions can suitably handle. As a result, multiple iterations through the initialization processing are often required. Each additional iteration also adds to the delay for obtaining initialization and the establishment of a data link. The conventional initialization processing also has to be restarted if the data link cannot provide any of the requested rates for upstream or downstream data transfer. Further, even when the data link is established, the data link will sometimes fail and then require re-initialization. These drawbacks of the conventional initialization processing induce inefficiencies and inflexibility into a data transmission system and thus hinder performance.

Thus, there is a need for improved initialization techniques for initializing data transfer between a pair of transceivers in a multicarrier modulation transmission system.

SUMMARY OF THE INVENTION

Broadly speaking, the invention relates to improved initialization techniques for initializing data transfer between a pair of transceivers in a multicarrier modulation transmission system. The initialization process for the pair of transceivers is performed efficiently and with better centralized control.

The invention can be implemented in numerous ways, including as a method, apparatus, system, or computer readable media. Several embodiments of the invention are discussed below.

As a method for initializing a pair of transceivers of a multicarrier transmission system for subsequent transfer of data between the pair of transceivers over a link, an embodiment of the invention includes the operations of: producing, at the first transceiver of the pair of transceivers, first direction performance information for data transmissions in a first direction; producing, at the second transceiver of the pair of transceivers, second direction performance information for data transmissions in a second direction; forwarding the second direction performance information from the second transceiver to the first transceiver; determining, at the first transceiver of the pair of transceivers, first direction bit allocations and second direction bit allocations, the first direction bit allocations being determined based on the first direction performance information and the second direction bit allocations being determined based on the second direction performance information; and thereafter forwarding the first direction bit allocation and the second direction bit allocations from the first transceiver to the second transceiver.

Preferably, the multicarrier transmission system includes a central office and a remote unit, the central office having at least the first transceiver, and the remote unit having the second transceiver. Also, one of the central office and the remote unit preferably controls the determining of both the first direction bit allocations and the second direction bit allocations without interaction with the other.

As a transceiver for a data transmission system using multicarrier modulation, an embodiment of the invention includes a bit allocation table, a data symbol encoder, a multicarrier modulation unit, a digital-to-analog converter, and a controller. The bit allocation table stores bit allocation information including separate bit allocation information for a plurality of carriers of the multicarrier modulation. The data symbol encoder receives digital data to be transmitted and encodes bits associated with the digital data onto the carriers based on the bit allocation information stored in the bit allocation table. The multicarrier modulation unit modulates the encoded bits on the carriers to produce modulated signals. The digital-to-analog converter converts the modulated signals to analog signals. The controller performs initialization processing for the transceiver to set the bit allocation information in the bit allocation table. The initialization processing includes the operations of: determining channel and noise characteristics for data transmissions to the transceiver from a remotely located transceiver; producing first direction performance information for data transmissions to the transceiver from the remotely located transceiver based on the channel and noise information; receiving second direction performance information from the remotely located transceiver; determining first direction bit allocations and second direction bit allocations, the first direction bit allocations being based on the first direction performance information and the second direction bit allocations being based on the second direction performance information; and thereafter forwarding the first direction bit allocations and the second direction bit allocations from the transceiver to the remotely located transceiver.

As a computer readable medium containing program instructions for initializing a pair of transceivers of a multicarrier transmission system for subsequent transfer of data between the pair of transceivers over a link, an embodiment of the invention includes: computer readable code devices for producing, at the first transceiver of the pair of transceivers, first direction performance information for data transmissions in a first direction; computer readable code devices for producing, at the second transceiver of the pair of transceivers, second direction performance information for data transmissions in a second direction; computer readable code devices for forwarding the second direction performance information from the second transceiver to the first transceiver; computer readable code devices for determining, at the first transceiver of the pair of transceivers, first direction bit allocations and second direction bit allocations, the first direction bit allocations being determined based on the first direction performance information and the second direction bit allocations being determined based on the second direction performance information; and computer readable code devices for thereafter forwarding the first direction bit allocations and the second direction bit allocations from the first transceiver to the second transceiver.

The advantages of the invention are numerous. One advantage of the invention is that the control of bit and energy allocations is centralized at a central office. This eliminates the burdensome need of conventional techniques to perform re-starts and/or numerous iterations of the conventional initialization processing before finalizing on bit and energy allocations. Another advantage of the invention is that the exchange of data between a central office and a remote unit requires only a single pass, whereas previously multiple passes were required. Another advantage of the invention is that by having all of the performance information present at the central office, changes or upgrades to the system are easily performed without having to update remote units. Still another advantage of the invention is that the initialization processing according to the invention is suitable for use with a superframe based system in which various superframe formats are available for selection and activation by the central office.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved initialization techniques for initializing data transfer between a pair of transceivers in a multicarrier modulation transmission system. The multicarrier modulation transmission system normally includes a central office and a remote unit, with the central office having at least one transceiver and the remote unit having a transceiver. For each pair of transceivers, the transceiver at either the central office or the remote unit controls the determining of bit allocations for both upstream and downstream data transmissions without assistance from the other transceiver of the pair. The initialization processing for the pair of transceivers is thus performed efficiently and with better centralized control.

Embodiments of the invention are discussed below with reference to FIGS. 2A–6. However, those skilled in the art will readily appreciate that the detailed description given herein with respect to these figures is for explanatory purposes as the invention extends beyond these limited embodiments.

Figure 1A:
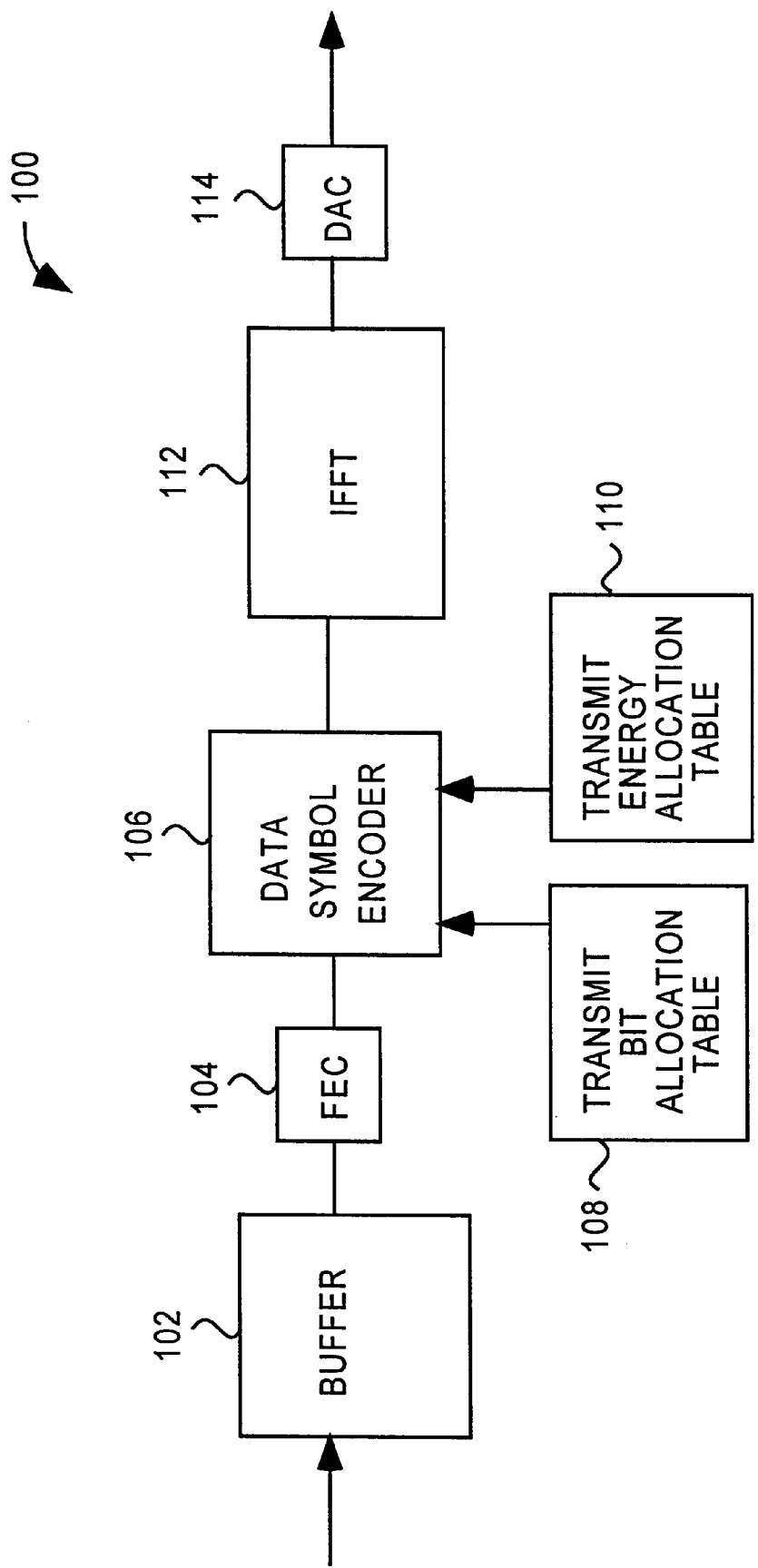
FIG. 1A is a block diagram of a conventional transmitter for a multicarrier modulation transmission system.
Figure 1B:
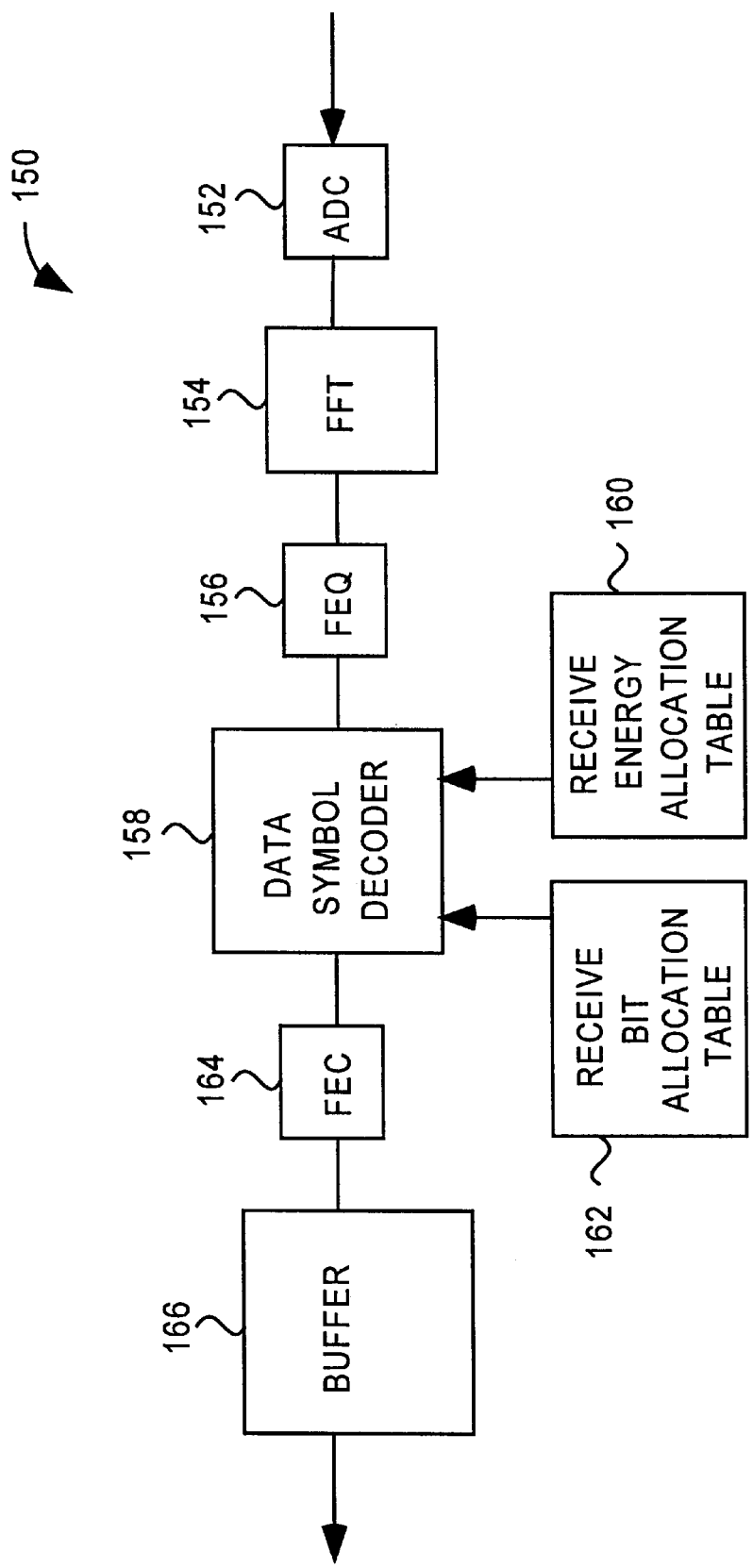
FIG. 1B is a block diagram of a remote receiver for a conventional multicarrier modulation transmission system.
Figure 1C:
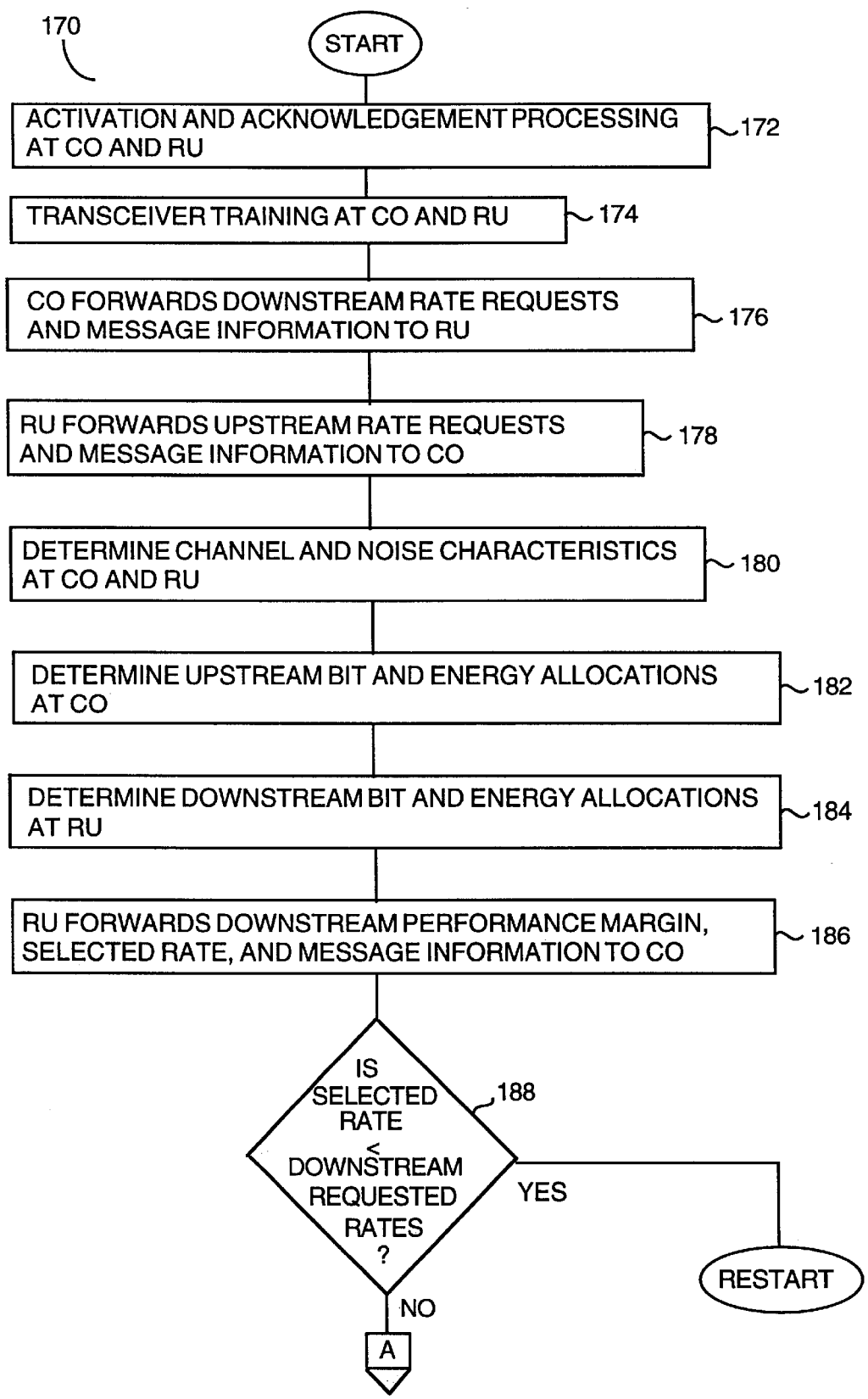
FIGS. 1C and 1D are flow diagrams of conventional initialization processing.
Figure 1D:
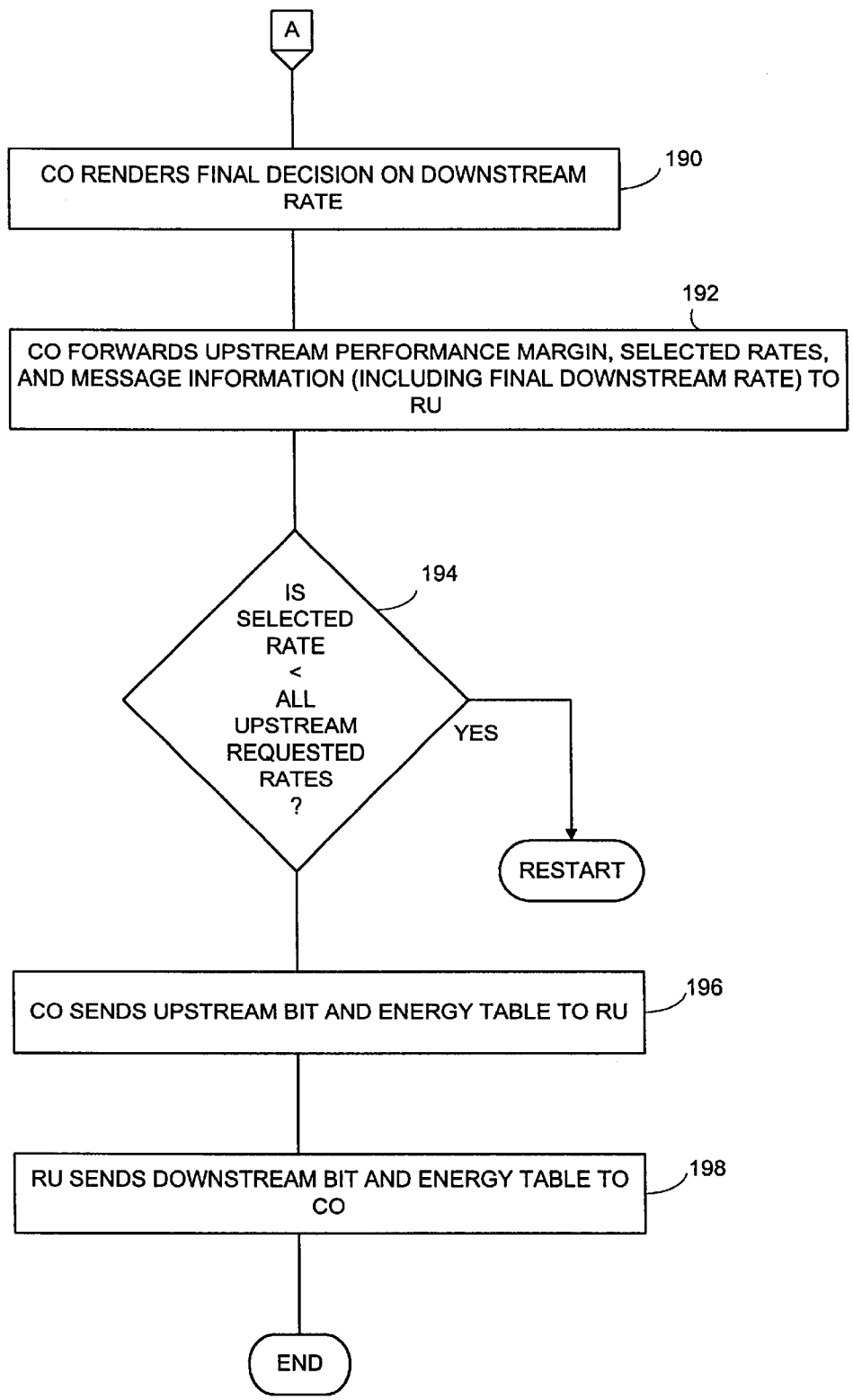
Figure 2A:
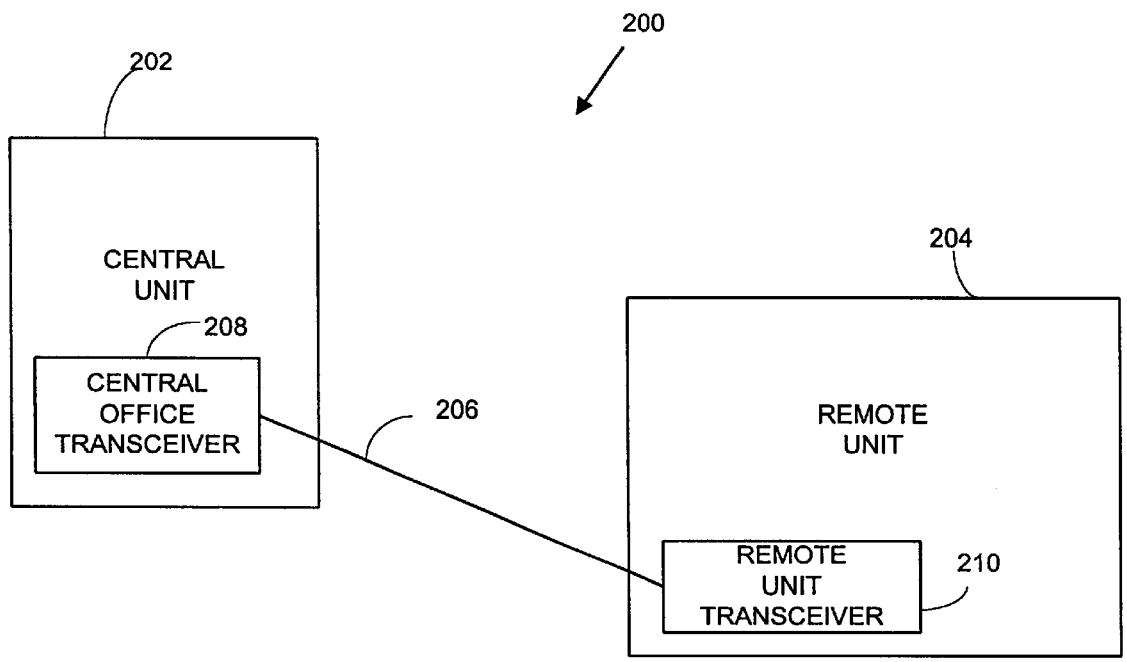
FIG. 2A is a block diagram of a data transmission system.

FIG. 2A is a block diagram of a data transmission system 200. The data transmission system 200 provides for data communications between a central unit 202 and a remote unit 204. The remote unit 204 is connected to the central unit 202 over a communication link 206. More particularly, the central unit 202 includes a central transceiver 208 that connects to a remote unit transceiver 210 in the remote unit 204 via the communication link 206. Although FIG. 2A illustrates only a single remote unit, the central office 202 will typically service a plurality of different remote units. The central transceiver 208 and the remote unit transceiver 210 preferably utilize multicarrier modulation techniques to transmit and receive data.

Figure 2B:
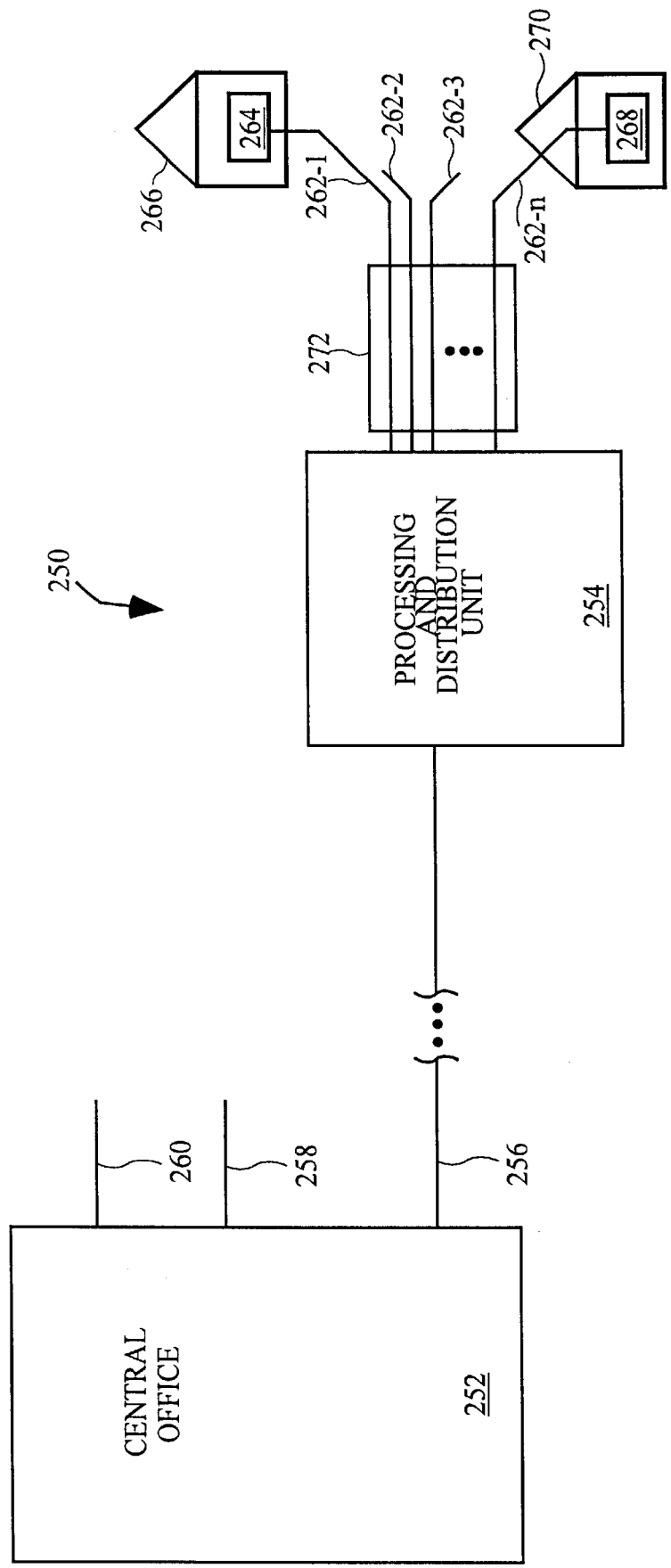
FIG. 2B is a block diagram of an exemplary telecommunications network suitable for implementing the invention.

FIG. 2B is a block diagram of an exemplary telecommunications network 250 suitable for implementing the invention. The telecommunications network 250 includes a central office 252. The central office 252 services a plurality of distribution posts to provide data transmission to and from the central office 252 to various remote units. In this exemplary embodiment, each of the distribution posts is a processing and distribution unit 254 (node). The processing and distribution unit 254 is coupled to the central office 252 by a high speed, multiplexed transmission line 256 that may take the form of a fiber optic line. Typically, when the transmission line 256 is a fiber optic line, the processing and distribution unit 254 is referred to as an optical network unit (ONU). The central office 252 also usually interacts with and couples to other processing and distribution units (not shown) through high speed, multiplexed transmission lines 258 and 260, but only the operation of the processing and distribution unit 254 is discussed below. In one embodiment, the processing and distribution unit 254 includes a modem (central modem). The processing and distribution unit 254 may be a general-purpose computing device such as a digital signal processor (DSP) or a dedicated special purpose device. As an example, the central unit 202 in FIG. 2A might include the central office 202 as well as the processing and distribution unit 254.

The processing and distribution unit 254 services a multiplicity of discrete subscriber lines 262-1 through 262-n. Each subscriber line 262 typically services a single end user. The end user has a remote unit suitable for communicating with the processing and distribution unit 254 at very high data rates. More particularly, a remote unit 264 of a first end user 266 is coupled to the processing and distribution unit 254 by the subscriber line 262-1, and a remote unit 268 of a second end user 270 is coupled to the processing and distribution unit 254 by the subscriber line 262-n. The remote units 264 and 268 include a data communications system capable of transmitting data to and receiving data from the processing and distribution unit 254. In one embodiment, the data communication systems are modems. The remote units 264 and 268 can be incorporated within a variety of different devices, including for example, a telephone, a television, a monitor, a computer, a conferencing unit, etc.

The subscriber lines 262 serviced by the processing and distribution unit 254 are bundled in a shielded binder 272 as the subscriber lines 262 leave the processing and distribution unit 254. The shielding provided by the shielded binder 272 generally serves as a good insulator against the emission (egress) and reception (ingress) of electromagnetic interference. However, the last segment of these subscriber lines (commonly referred to as a "drop") branches off from the shielded binder 272 and is coupled directly or indirectly to the end user's remote units. The "drop" portion of the subscriber line between the respective remote unit and the shielded binder 272 is normally an unshielded, twisted-pair wire.

Although FIG. 2B illustrates only a single remote unit coupled to a respective subscriber line, it should be recognized that a plurality of remote units can be coupled to a single subscriber line. It should be recognized that in other embodiments the processing and distribution 254 may be internal or included in the central office. Moreover, although FIG. 2B illustrates the processing and distribution unit 254 as being centralized processing, it should be recognized that the processing need not be centralized and could be performed independently for each of the subscriber lines 262.

Figure 3:
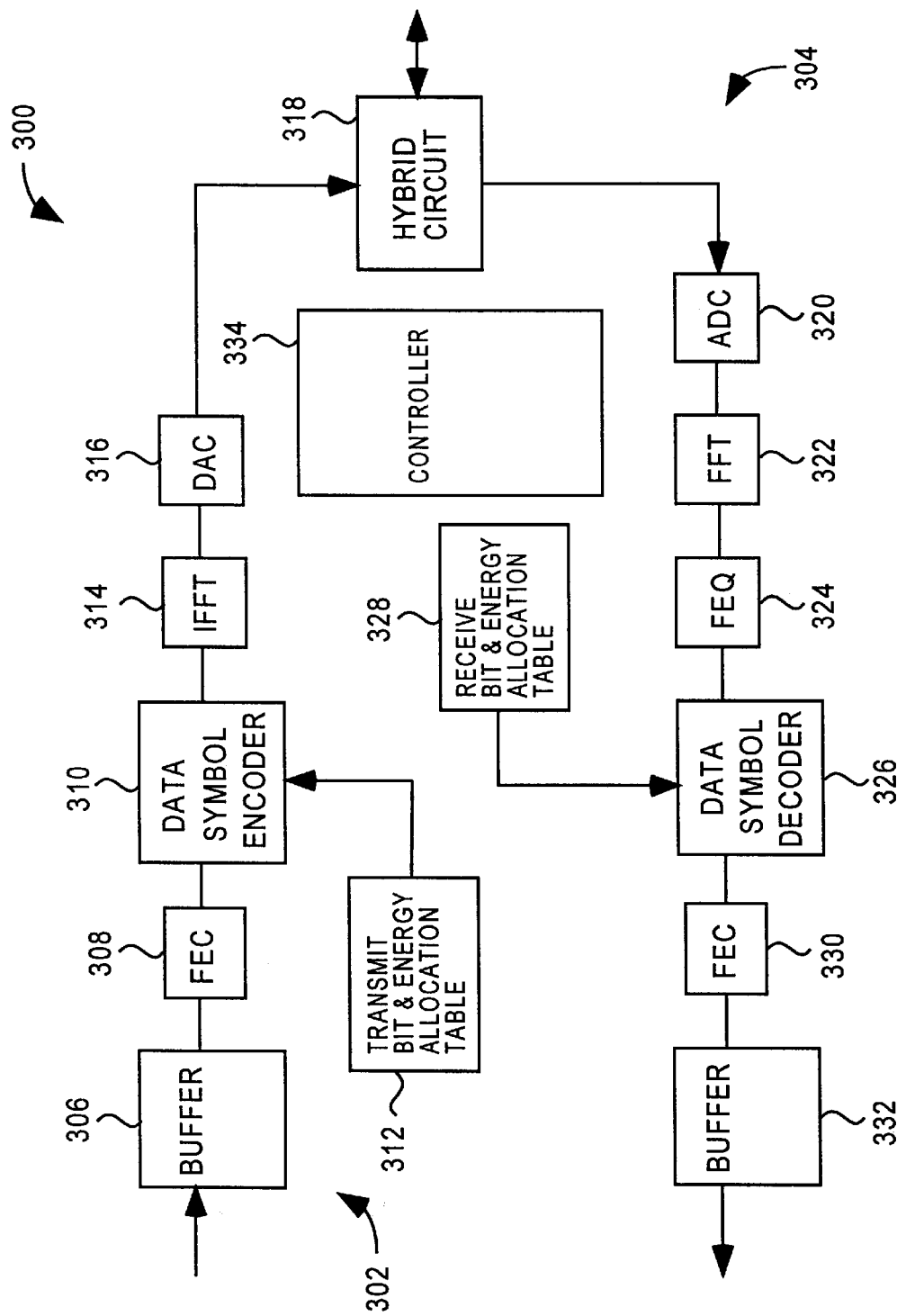
FIG. 3 is a block diagram of a transceiver according to one embodiment of the invention.

FIG. 3 is a block diagram of a transceiver 300 according to one embodiment of the invention. The construction of the transceiver 300 illustrated in FIG. 3 may be used as either or both of the central office transceiver 208 and the remote unit transceiver 210.

The transceiver 300 has both a transmitter side 302 and a receiver side 304 and is suitable for bi-directional data transmission. The transmitter side 302 transmits data by supplying it to a buffer 306. The data is then obtained from the buffer 102 and supplied to the FEC unit 308. A data symbol encoder 310 then operates to encode the data onto frequency tones of a symbol based on bit allocation information obtained from a transmit bit and energy allocation table 312. The encoded data is then supplied to the IFFT unit 314 which modulates the data and converts the modulated data into time domain data. The time domain data is then converted to analog signals by the DAC 316. The analog signals are then supplied to a hybrid circuit 318 and transmitted over a channel.

The receiver side 304 of the transceiver 300 receives analog signals that have been transmitted over a channel via the hybrid circuit 318. In other embodiments, the hybrid circuit 318 is not needed and replaced by an interface circuit that couples the transmit side 302 and the receiver side 304 to the channel. The received analog signals are then supplied to the ADC 320 which converts the received analog signals to digital signals. The digital signals are then supplied to the FFT unit 322 which produces frequency domain signals. The frequency domain signals are then equalized by the FEQ unit 324. The equalized signals are then supplied to a data symbol decoder 326. The data symbol decoder 326 operates to decode the equalized signals to recover data that has been transmitted on each of the frequency tones of the symbol being received. The decoding by the data symbol decoder 326 is performed based on bit allocation information stored in a receive bit and energy allocation table 328. The decoded data is then supplied to the FEC unit 330 and then stored in a buffer 332.

The transceiver 300 also includes a controller 334 for controlling the overall operation of the transceiver 300. The controller 334 controls the transceiver 300 to perform the initialization processing and to monitor steady-state data transmission. The controller 334 can be used by both transmit and receive sides of a transceiver, shared among a plurality of transceivers, or individually provided for each transmitter and receiver. For example, the controller 334 can be implemented by a digital signal processor, a microprocessor or microcontroller, or specialized circuitry.

The transmitter side 302 and the receiver side of the transceiver 300 illustrated in FIG. 3 optionally includes other components. For example, the transmitter side 302 could add a cyclic prefix to symbols after the IFFT unit 314, and the receiver side 304 can then remove the cyclic prefix before the FFT unit 322. Also, the receiver 304 can provide a time domain equalizer (TEQ) unit between the ADC 320 and the FFT unit 322. Additional details on TEQ units are contained in U.S. Patent No. 5,285,474 and U.S. Provisional application Ser. No. 60/046,244, filed May 12, 1997 (See U.S. patent application Ser. No.: 09/066,272, filed Apr. 24, 1998. and entitled POLY-PATH TIME DOMAIN EQUALIZATION, which are hereby incorporated by reference.

Generally speaking, the bit allocation information stored in the transmit bit and energy allocation table 312 and the bit allocation information stored in the receive bit and energy allocation table 328 are not the same due to different noise impairments. The transmit bit and energy allocation table 312 would, for example, contain bit and energy allocation information that is to be utilized in coding data to be transmitted by the transmitter side 302. On the other hand, the received bit and energy allocation information stored in the receive bit and energy allocation table 328 would, for example, contain bit and energy allocation information to be utilized in decoding data receiver by the receiver side 304.

Figure 4:
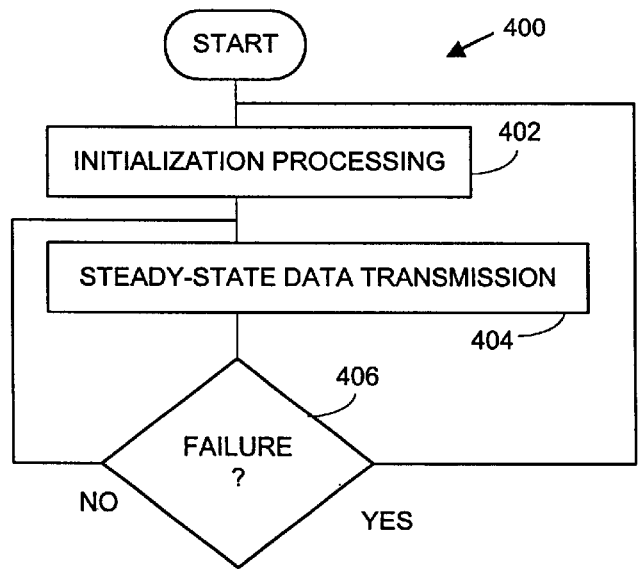
FIG. 4 is a flow diagram of basic communication link processing.

FIG. 4 is a flow diagram of basic communication link processing 400. The communication link processing 400 begins with initialization processing 402. In general, the initialization processing 402 includes the general operations of activation and acknowledgment of initialization, transceiver training at both a central office and a remote unit, channel analysis, and exchange of transmitter settings between the central office and the remote unit. After completing the initialization processing 402, the communication link processing 400 operates steady-state data transmission 404. During steady-state data transmission 404, data is transmitted and received over the communication link coupling the central office and the remote unit. A monitoring function 406 determines whether the steady-state data transmission has failed. When the monitoring function 406 determines that the steady-state data transmission has failed, the communication link processing 400 is restarted and thus repeats the initialization processing 402 to again attain the steady-state data transmission 404 condition. On the other hand, when the monitoring function 406 determines that the steady-state data transmission 404 has not failed, the communication link processing 400 continues with the steady-state data transmission 404.

Figure 5:
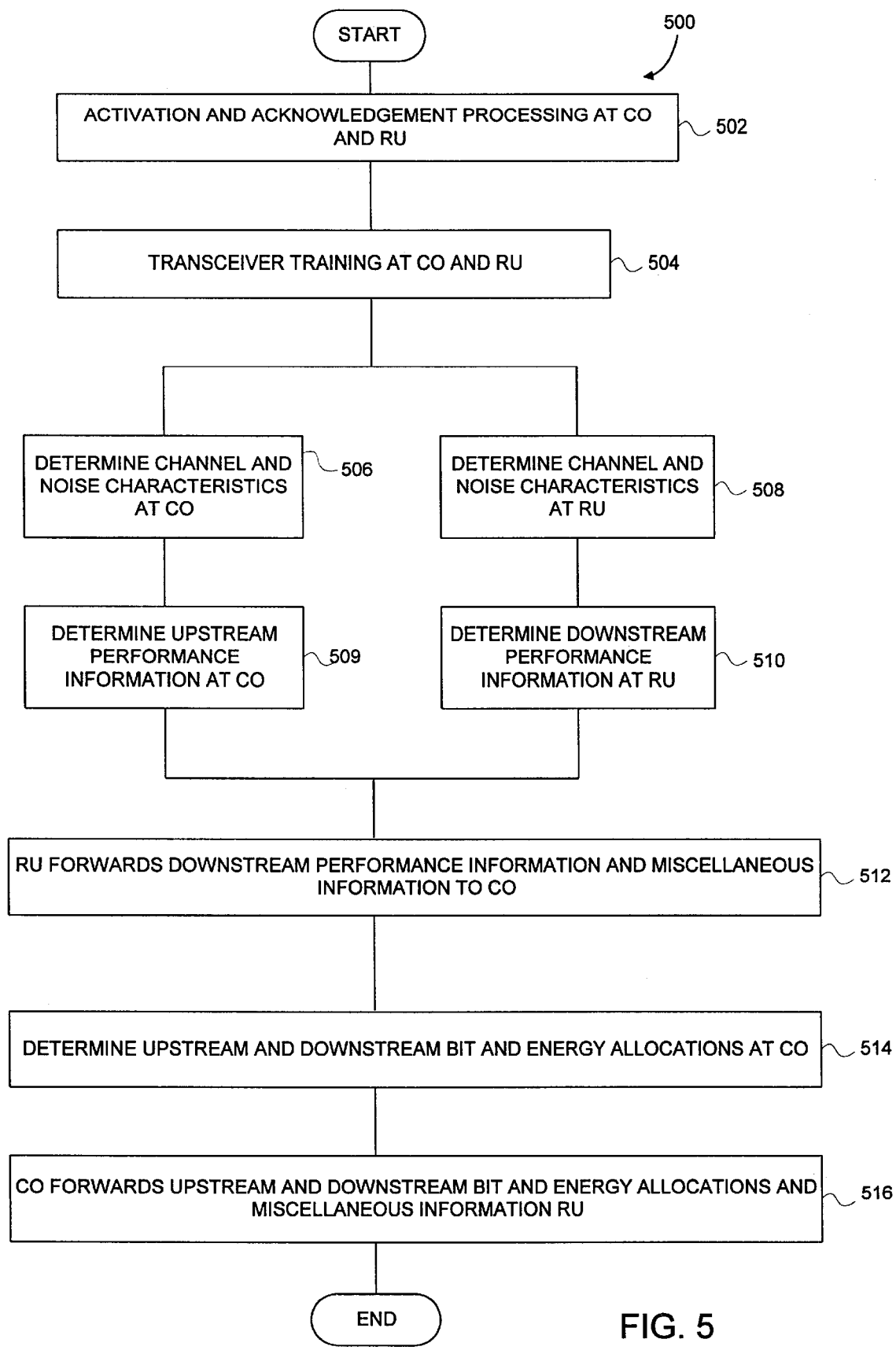
FIG. 5 is a flow diagram of initialization processing according to one embodiment of the invention.

FIG. 5 is a flow diagram of initialization processing 500 according to one embodiment of the invention. The initialization processing 500 initially begins with performance of activation and acknowledgment processing 502 at both the central office (CO) and the remote unit (RU). Next, transceiver training 504 is performed at both the central office (CO) and the remote unit (RU). As an example, in the case where the central office (CO) and the remote unit (RU) arc ADSL transceivers, additional details on one embodiment of the activation and acknowledge processing 502 and the transceiver training 504 are described in TIEI ADSL Standard of American National Standard Institute (ANSI), which is hereby incorporated by reference. However, it is noted that some traditional training operations may be advantageously performed later in the initializations processing, such as after the determination of channel and noise characteristics.

Rate requests are initially provided by a network, such as a telephone network, that typically couples to the central office (CO). The rate requests are usually provided before, during or just after the activation and acknowledgment processing 502.

Channel and noise characteristics are then independently determined at both the central office (CO) and the remote unit (RU). Here, with coordination between the central office (CO) and the remote unit (RU), the remote unit (RU) transmits a predetermined data sequence and then the central office (CO) receives the transmitted data sequence and determines 506 therefrom channel and noise characteristics for upstream transmissions from the remote unit (RU) to the central office (CO). Similarly, with coordination between the central office (CO) and the remote unit (RU), the central office (CO) transmits a predetermined data sequence and then the remote office (CO) receives the transmitted data sequence and determines 508 therefrom channel and noise characteristics for downstream transmissions from the central office (CO) to the remote unit (RU).

After the central office (CO) determines 506 the channel and noise characteristics, the central office (CO) determines 509 upstream performance information. Also, after the remote unit (RU) determines 508 the channel and noise characteristics, the remote unit (RU) determines 510 downstream performance information. As an example, in a multicarrier modulation system, the performance information could be signal-to-noise ratios (SNRs) for each of the frequency tones. Alternatively, the performance information could be a number of bits supported by each of the frequency tones assuming a predetermined performance margin and bit error rate (BER), and/or channel and noise estimates (directly or nearly directly from the determined channel and noise characteristics), and/or any other information that can be correlated to signal-to-noise information. Whatever the nature of the performance information being used, the performance information is based on or derived from the associated channel and noise characteristics. The blocks 506 and 509 are independent of blocks 508 and 510, and thus these sets of blocks can be performed in parallel as depicted in FIG. 5 or alternatively could be serially performed.

Next, the remote unit (RU) forwards 512 the downstream performance information, as well as miscellaneous information, to the central office (CO). The miscellaneous information may, for example, include one or more of line condition information, transceiver limitations, options or features, or messages. The miscellaneous information could also include the rate requests from the remote unit (RU). After receiving the downstream performance information from the remote unit (RU), the central office (CO) determines 514 upstream and downstream bit and energy allocations. The bit and energy allocations can be determined using a variety of approaches, including those approaches described in U.S. Pat. No. 5,400,322 and U.S. Pat. No. 6,009,122, which are hereby incorporated by reference. If the central office (CO) cannot satisfy one of the rate requests for upstream and downstream data transmissions, then the central office (CO) can re-negotiate with the network for some other rate that the channel can support.

The central office (CO) then forwards 516 upstream and downstream bit and energy allocations, as well as miscellaneous information, to the remote unit (RU). The miscellaneous information may, for example, include one or more of line condition information, performance margin, transceiver limitations, options or features, or messages. Optionally, the central office (CO) could also forward the upstream performance information to the remote unit (RU) for possible subsequent use by the remote unit (RU).

At this point, the bit and energy allocations have been exchanged between the central office (CO) and the remote unit (RU). In one embodiment, the bit and energy allocations are stored in data storage tables in the associated transceivers at the central office (CO) and the remote unit (RU), such as the tables 312 and 328 illustrated in FIG. 3. That is, the central office (CO) includes a table of the bit and energy allocations for transmissions from the central office (CO) as well as a table of bit and energy allocations for reception of data transmitted from the remote unit (RU). Likewise, the remote unit (RU) includes a table of bit and energy allocations for transmissions of data to the central office (CO) as well as a table for bit and energy allocations for reception of data transmitted by the central office (CO). Following block 516, the initialization processing 500 is complete and ends.

Figure 6:
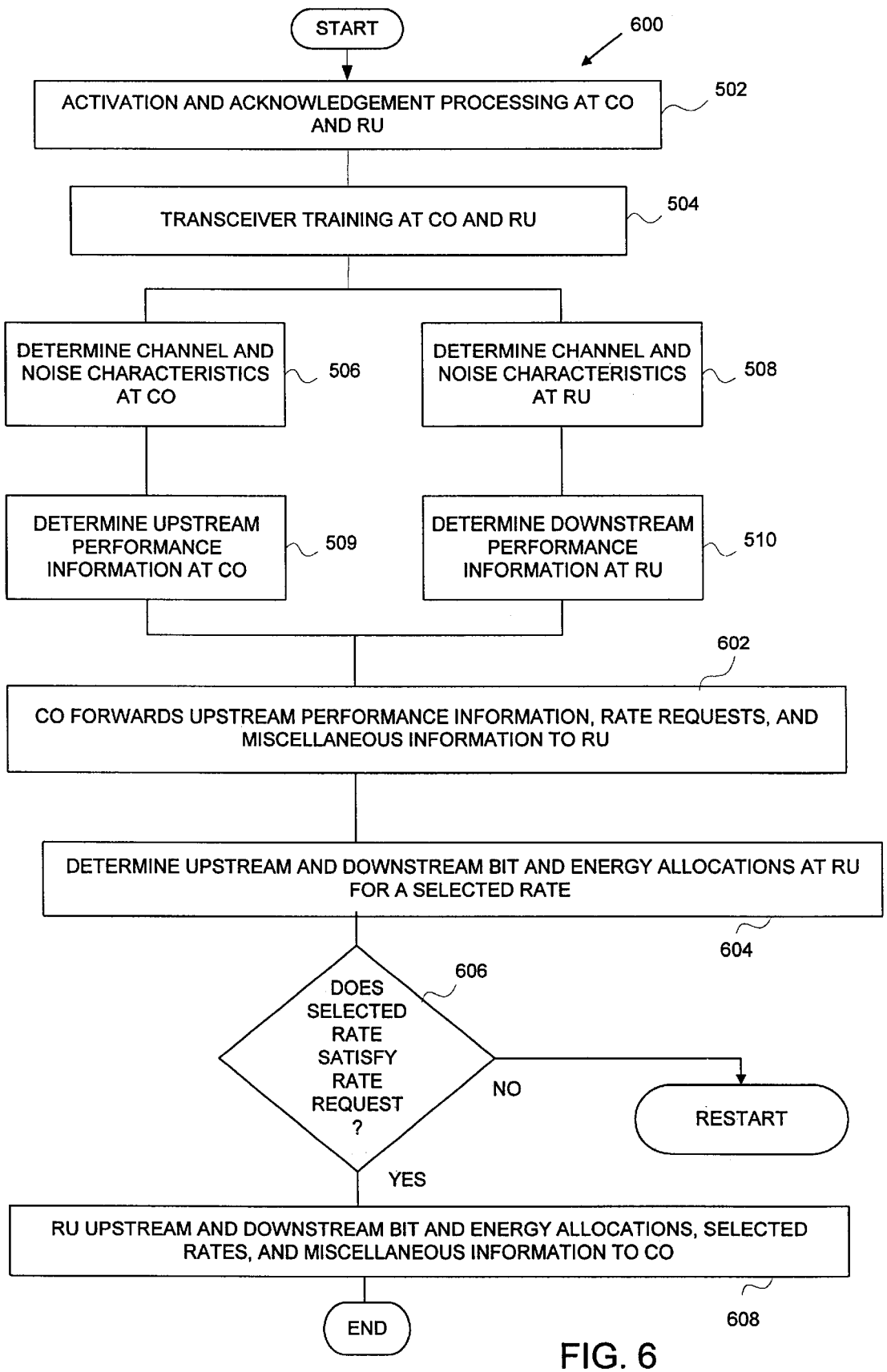
FIG. 6 is a flow diagram of initialization processing according to another embodiment of the invention.

FIG. 6 is a flow diagram of initialization processing 600 according to another embodiment of the invention. The bit and energy allocations for the initialization processing 600 are determined by the remote unit (RU), instead of by the central office (CO) as was the case for the initialization processing 500 illustrated in FIG. 5. One advantage of this embodiment is that the processing load for determining the bit and energy allocations is off loaded to the remote unit (RU) which alleviates substantial processing loads from the central office (CO) where space or power limitations are more of a concern.

Blocks 502–510 of the initialization processing 600 are the same as the corresponding blocks of the initialization processing 500 illustrated in FIG. 5, and are therefore not again described.

Next, the central office (CO) forwards 602 the upstream performance information, rate requests and miscellaneous information to the remote unit (RU). The miscellaneous information may, for example, include one or more of line condition information, transceiver limitations, options or features, or messages. After receiving the upstream performance information from the central office (CO), the remote unit (RU) determines 604 upstream and downstream bit and energy allocations for a selected rate. The bit and energy allocations can be determined using a variety of approaches, including those approaches described in U.S. Pat. No. 5,400,322 and U.S. Pat. No. 6,009,122.

A decision block 606 then determines whether the selected rate satisfies one of the rate requests provided by the central office (CO). If the selected rate does not satisfy one of the rate requests provided by the central office (CO), then the initialization processing 600 is restarted.

On the other hand, if the selected rate does satisfy one of the rate requests provided by the central-office (CO), then the initialization processing 600 continues. The remote unit (RU) then forwards 608 upstream and downstream bit and energy allocations, selected rates and miscellaneous information to the central office (CO). The miscellaneous information may, for example, include one or more of line condition information, performance margin, transceiver limitations, options or features, or messages. Optionally, the remote unit (RU) could also forward the downstream performance information to the central office (CO) for possible subsequent use by the central office (CO).

At this point, the bit and energy allocations have been exchanged between the central office (CO) and the remote unit (RU). In one embodiment, the bit and energy allocations are stored in data storage tables in the associated transceivers at the central office (CO) and the remote unit (RU), such as the tables 312 and 328 illustrated in FIG. 3. That is, the central office (CO) includes a table of the bit and energy allocations for transmissions from the central office (CO) as well as a table of bit and energy allocations for reception of data transmitted from the remote unit (RU). Likewise, the remote unit (RU) includes a table of bit and energy allocations for transmissions of data to the central office (CO) as well as a table for bit and energy allocations for reception of data transmitted by the central office (CO). Following block 608, the initialization processing 600 is complete and ends.

In the initialization processing 500, 600 described above, bit and energy allocations are determined. However, it should be recognized that some implementations may only require determination of bit allocations. In such implementations, the initialization is essentially the same except that the energy allocations are neither computed or stored.

It should be understood that the reference to central office (CO) above with reference to FIGS. 4–6 is generally referring to the central side (e.g., central unit) of a multicarrier modulation transmission system. As such, the operations performed by the central office (CO) in the link processing 400 and the initialization processing 500, 600 may be performed by any devices at the central side, including the central office or a processing and distribution unit.

According to the invention, the amount of information that is required to be exchanged between the central office (CO) and a remote unit (RU) is substantially reduced as compared to conventional techniques. Conventionally, two rounds of negotiation or exchanges of information were required in order to determine the bit and energy allocations, whereas with the present invention, only a single round of negotiation or exchange of information is utilized. Hence, with the invention, initialization can also be achieved faster and less data need to be exchanged during initialization.

The advantages of the invention are numerous. One advantage of the invention is that the control of bit and energy allocations is centralized at a central office. This eliminates the burdensome need of conventional techniques to perform re-starts and/or numerous iterations of the conventional initialization processing before finalizing on bit and energy allocations. Another advantage of the invention is that the exchange of data between a central office and a remote unit requires only a single pass, whereas previously multiple passes were required. Another advantage of the invention is that by having all of the performance information present at the central office, changes or upgrades to the system are easily performed without having to update remote units. Still another advantage of the invention is that the initialization processing according to the invention is suitable for use with a superframe based system in which various superframe formats are available for selection and activation by the central office.

In the case in which a superframe structure is used to transmit the data, the initialization processing according to the invention can operate on the superframe and yield bit and energy allocations for the superframe. The initialization processing according to the invention is also suitable for allowing the central office (CO) to perform selection and alignment of superframes that includes a plurality of frames. The utilization, selection and alignment of superframes is discussed in more detail in U.S. Pat. No. 6,009,122.

During the steady-state data transmission, the bit and energy allocations can be updated using a bit swap technique such as described in U.S. Pat. No. 5,400,322, which is hereby incorporated by reference. Such updating serves to keep the bit allocation for the frame constant but flexible enough to compensate for noise variances that vary from carrier to carrier within the frame. Hence, the bit swap technique advantageously prolongs the steady-state data transmission condition, and thus delay the need to require restarting of the initialization process.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A transceiver for a data transmission system using multicarrier modulation, said transceiver comprising:
    a bit allocation table, said bit allocation table stores bit allocation information including separate bit allocation information for a plurality of carriers of the multicarrier modulation;
    a data symbol encoder, said data symbol encoder receives digital data to be transmitted and encodes bits associated with the digital data onto the carriers based on the bit allocation information stored in said bit allocation table;
    a multicarrier modulation unit, said multicarrier modulation unit modulates the encoded bits on the carriers to produce modulated signals;
    a digital-to-analog converter, said digital-to-analog converter converts the modulated signals to analog signals; and
    a controller, said controller performs initialization processing for said transceiver to set the bit allocation information in said bit allocation table, the initialization processing including the operations of: determining channel and noise characteristics for data transmissions to said transceiver from a remotely located transceiver; producing first direction performance information for data transmissions to said transceiver from the remotely located transceiver based on the channel and noise information; receiving second direction performance information from the remotely located transceiver; determining first direction bit allocations and second direction bit allocations, the first direction bit allocations being based on the first direction performance information and the second direction bit allocations being based on the second direction performance information; and thereafter forwarding the first direction bit allocations and the second direction bit allocations from said transceiver to the remotely located transceiver.

2. A transceiver as recited in claim 1, wherein said controller determines both the first direction bit allocations and the second direction bit allocations without interaction with the remotely located transceiver.

3. A transceiver as recited in claim 1, wherein the first direction performance information is produced based on the channel and noise characteristics for data transmissions in the first direction.

4. A transceiver as recited in claim 1, wherein said modulation unit modulates the encoded bits on the frequency tones of a symbol using Discrete Multi Tone (DMT) modulation.

5. A transceiver as recited in claim 1,
    wherein said bit allocation table is a superframe bit allocation table that stores bit allocation information for a superframe, the superframe having a plurality carriers in each of a plurality of frames, and
    wherein said data symbol encoder allocates bits differently in the various frames of a superframe by using different portions of the superframe bit allocation information stored in said superframe bit allocation table.

6. A computer readable medium containing program instructions for initializing a pair of transceivers of a multicarrier transmission system for subsequent transfer of data between the pair of transceivers over a link, said computer readable medium comprising:
    computer readable code devices for producing, at the first transceiver of the pair of transceivers, first direction performance information for data transmissions in a first direction;
    computer readable code devices for producing, at the second transceiver of the pair of transceivers, second direction performance information for data transmissions in a second direction;
    computer readable code devices for forwarding the second direction performance information from the second transceiver to the first transceiver;
    computer readable code devices for determining, at the first transceiver of the pair of transceivers, first direction bit allocations and second direction bit allocations, the first direction bit allocations being determined based on the first direction performance information and the second direction bit allocations being determined based on the second direction performance information; and
    computer readable code devices for thereafter forwarding the first direction bit allocations and the second direction bit allocations from the first transceiver to the second transceiver.

7. A computer readable medium as recited in claim 6,
    wherein said computer readable medium further comprises:
    computer readable code devices for determining, at a first transceiver of the pair of transceivers, channel and noise characteristics for data transmissions in a first direction; and
    computer readable code devices for determining, at a second transceiver of the pair of transceivers, channel and noise characteristics for data transmissions in a second direction, and wherein the first direction performance information is produced based on the channel and noise characteristics for data transmissions in the first direction, and the second direction performance information is produced based on the channel and noise characteristics for data transmissions in the second direction.

8. A computer readable medium as recited in claim 7, wherein the first direction performance information and the second direction performance information are signal-to-noise ratio information.

9. A computer readable medium as recited in claim 7, wherein the first transceiver in within a central office and the second transceiver is a remote unit, and wherein the central office determines the first direction bit allocations and the second direction bit allocations to the exclusion of the remote unit.

10. A computer readable medium as recited in claim 7, wherein the central office receives rate requests from a network coupled to the central office, and none of the rate requests are forwarded to the remote unit.

* * * * *